(12) United States Patent
Harmon et al.

(10) Patent No.: US 9,918,395 B1
(45) Date of Patent: Mar. 13, 2018

(54) THREE PART FOLDABLE HOUSING SUPPORTING MULTIPLE USE POSITIONS IN AN ELECTRONIC DEVICE

(71) Applicant: Motorola Mobility LLC, Chicago, IL (US)

(72) Inventors: Roger W. Harmon, Crystal Lake, IL (US); Alberto R. Cavallaro, Northbrook, IL (US); Jason P. Wojack, Libertyville, IL (US)

(73) Assignee: Motorola Mobility LLC, Chicago, IL (US)

(*) Notice: Subject to any disclaimer, the term of this patent is extended or adjusted under 35 U.S.C. 154(b) by 0 days.

(21) Appl. No.: 15/263,465

(22) Filed: Sep. 13, 2016

(51) Int. Cl.
  *G06F 1/16* (2006.01)
  *H05K 5/00* (2006.01)
  *H05K 5/02* (2006.01)
  *H05K 7/16* (2006.01)
  *H02J 7/35* (2006.01)
  *H02J 7/02* (2016.01)

(52) U.S. Cl.
  CPC ............ *H05K 5/0017* (2013.01); *H02J 7/025* (2013.01); *H02J 7/355* (2013.01); *H05K 5/0221* (2013.01); *H05K 7/16* (2013.01)

(58) Field of Classification Search
  CPC ............. H05K 5/0004; H05K 5/00021; G06F 1/1633; G06F 1/1641; G06F 1/1652
  See application file for complete search history.

(56) References Cited

U.S. PATENT DOCUMENTS

| | | | |
|---|---|---|---|
| D761,254 S * | 7/2016 | Yamazaki | D14/341 |
| 9,541,962 B2 * | 1/2017 | Siddiqui | G06F 1/1618 |
| 9,588,549 B2 * | 3/2017 | Endo | G06F 1/1652 |
| 2010/0064244 A1 * | 3/2010 | Kilpatrick, II | G06F 1/1616 715/773 |
| 2010/0201604 A1 * | 8/2010 | Kee | G06F 1/1616 345/1.3 |

(Continued)

OTHER PUBLICATIONS

DIY Trade webpage for "Original Foldable PU Protective Case Cover with Stand for UMI X1 3G Smartphone ("at URL http://www.diytrade.com/china/pd/11679736/Original"_Foldable_PU_Protective_Case_Cover_with_Stand_for_UMI_X1_3G_Smartphone.html".

*Primary Examiner* — Anthony Q Edwards
(74) *Attorney, Agent, or Firm* — Watson Intellectual Property Group

(57) ABSTRACT

The present application provides an electronic device having at least a three part housing foldable between multiple use positions. The three part housing includes a first housing part, a second housing part, and a third housing part, where each of the three housing parts has a front facing, a back facing, and two spaced apart sides respectively coupled between the front facing and back facing at opposite edges of the front and back facings. The second housing part is respectively movably coupled to a side of each the first housing part and the third housing part at a different one of the two spaced apart sides of the second housing part. The electronic device further includes a flexible display which extends along at least portions of the first housing part and the second housing part, and across the movably coupled sides, at which the first housing part is coupled to the second housing part. The third housing part is adapted to be moved relative to the second housing part to selectively cover at least a portion of the flexible display.

19 Claims, 9 Drawing Sheets

(56) References Cited

U.S. PATENT DOCUMENTS

| | | | | |
|---|---|---|---|---|
| 2011/0241998 | A1* | 10/2011 | McKinney | G06F 1/1616 345/168 |
| 2012/0307423 | A1* | 12/2012 | Bohn | G06F 1/1641 361/679.01 |
| 2013/0010405 | A1* | 1/2013 | Rothkopf | H04M 1/0216 361/679.01 |
| 2016/0014914 | A1* | 1/2016 | Stroetmann | G06F 1/1616 312/223.1 |

* cited by examiner

THREE PART FOLDABLE HOUSING SUPPORTING MULTIPLE USE POSITIONS IN AN ELECTRONIC DEVICE

FIELD OF THE APPLICATION

The present disclosure relates generally to a housing for an electronic device, and more particularly, to a housing having at least three parts which are movably coupled together to enable the selective positioning of the parts, relative to one another, between multiple different types of use positions.

BACKGROUND

Electronic devices, such as smartphones, are increasingly supporting use cases, where for certain functionality, it is desirable for the device to be able to support a larger display size. For example, larger display sizes can be desirable for viewing visual content as part of a media player or a browser, as well as for supporting the visual presentation of information as part of an application or program that is being executed by the device. However, such a trend needs to be balanced with a general desire for the overall size of the device to stay the same and even decrease in one or both of dimension and weight.

In an attempt to support larger display sizes without increasing the overall size of the device, device manufacturers have increasingly dedicated a larger percentage of the exterior surface to a display, where the display in many instances has grown in one or more dimensions to a size that dominates a particular surface, such as the front surface of the device. In at least some of these instances, the display has been allowed to extend into areas that had previously been used to support user inputs, such as areas of the surface that have previously supported a keypad, such as a numeric keypad.

In order to accommodate such an encroachment, at least some displays have evolved to support touch sensitivity including the ability to detect and decipher a user's input through an ability to detect a user interaction with different particular portions of the display, which in some instances can correspond with a visual representation of one or more objects, such as keys arranged to form a virtual keypad, whereby the location of the detected user interaction relative to the display can be used to distinguish between a desired interaction with different ones of the multiple keys.

Even more recently, device manufacturers have experimented with flexible displays, that might allow a display to extend across multiple housing parts and/or surfaces of the device including, for example, housing parts that can be selectively folded to support multiple use configurations including different respective sets of device dimensions to accommodate convenient user handling for each of multiple different sets of circumstances associated with the multiple use configurations. For example, when viewing visual content as part of a media player or browser, it may be convenient to have the device unfolded on a table, a desk, or the user's lap, to allow a larger size surface across which the display extends and with which visual content can be conveyed, as well as a larger surface through which the user might interact using an associated touch sensitivity. In other instances, it may be more convenient for the device including portions of the display to be folded to better support the device being sized so as to be held within the hand of the user, such as when the device is being held proximate the user's face to support voice communications. When folded, the device may also be more conveniently sized for storage, such as placement within one's pocket or purse.

While some more recently developed displays can allow for some degree of bending and folding, folds with a tighter radius of curvature in these displays can sometimes still be a challenge. The present inventors have recognized, that the tighter radius of curvature may be avoided by placing the display across the outside surface of the corresponding folding housing elements. However on the outside surface, the display may be more exposed to potentially damage-inflicting outside influences. The inventors have further recognized, that a third housing part, which is movable with respect to the other housing parts in at least some use configurations, can serve as at least a partial cover for the display placed on the outside surface of the other housing parts, thereby reducing the potential for harmful exposure. Furthermore, the third housing part can be used to support some use configurations, as well as to receive the placement of further device elements including some electronic components.

SUMMARY

The present application provides an electronic device having at least a three part housing foldable between multiple use positions. The three part housing includes a first housing part, a second housing part, and a third housing part, where each of the three housing parts has a front facing, a back facing, and two spaced apart sides respectively coupled between the front facing and back facing at opposite edges of the front and back facings. The second housing part is respectively movably coupled to a side of each the first housing part and the third housing part at a different one of the two spaced apart sides of the second housing part. The electronic device further includes a flexible display which extends along at least portions of the first housing part and the second housing part, and across the movably coupled sides, at which the first housing part is coupled to the second housing part. The third housing part is adapted to be moved relative to the second housing part to selectively cover at least a portion of the flexible display.

In at least one embodiment, the third housing part includes a hook proximate the side which is spaced apart from the side of the third housing part which is movably coupled to the second housing part. In at least some of these instances, the hook is adapted to engage the side of the first housing part which is spaced apart from the side of the first housing part which is movably coupled to the second housing part. In at least some of the same and other instances, the hook is adapted to engage at least one of the other two housing parts proximate the sides of the first and second housing parts that are movably coupled together.

In at least a further embodiment, the first housing part is adapted to fold open relative to the second housing part via the movable coupling therebetween, where at least the first housing part is positioned relative to the second housing part in a side by side arrangement, and where the front or back facing of the first housing part does not overlap the front or back facing of the second housing part.

In at least a still further embodiment, the third housing part includes electrical elements which support the operation of the electronic device.

These and other features, and advantages of the present disclosure are evident from the following description of one or more preferred embodiments, with reference to the accompanying drawings.

DETAILED DESCRIPTION OF THE PREFERRED EMBODIMENT(S)

Figure 1:
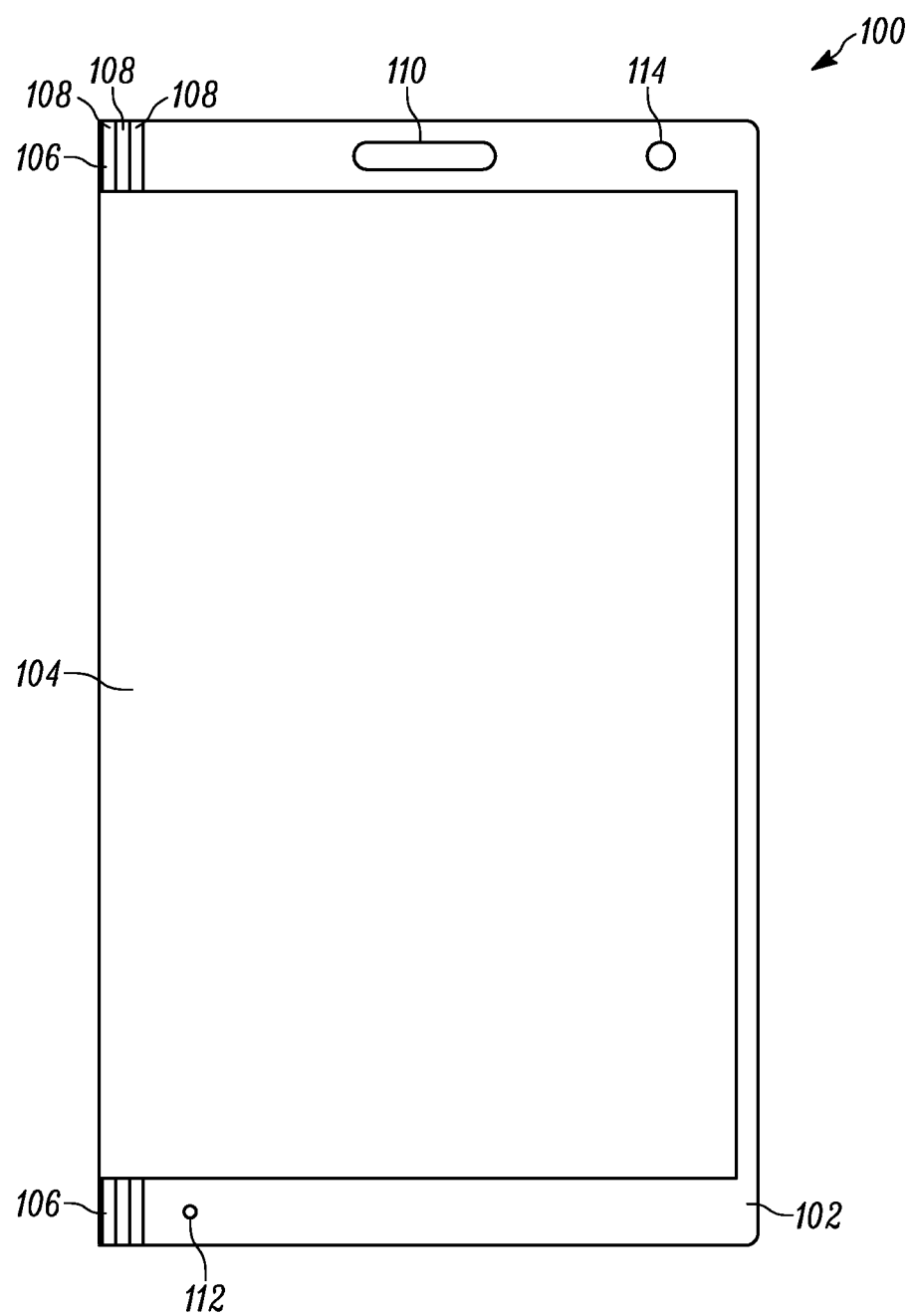
FIG. 1 is a front view of an exemplary electronic device, in a fully folded configuration.

While the present invention is susceptible of embodiment in various forms, there is shown in the drawings and will hereinafter be described presently preferred embodiments with the understanding that the present disclosure is to be considered an exemplification and is not intended to limit the invention to the specific embodiments illustrated. One skilled in the art will hopefully appreciate that the elements in the drawings are illustrated for simplicity and clarity and have not necessarily been drawn to scale. For example, the dimensions of some of the elements in the drawings may be exaggerated relative to other elements with the intent to help improve understanding of the aspects of the embodiments being illustrated and described.

FIG. 1 illustrates a front view of an exemplary electronic device 100, in a fully folded configuration. In the illustrated embodiment, the electronic device includes a three part housing which are movably coupled together, where in FIG. 1 only the middle housing part 102 can be seen. The housing parts coupled to each of the left and right sides of the middle housing part 102 are folded underneath the middle housing part 102, where in the illustrated embodiment the housing part to the left is folded first, so as to be immediately adjacent to the middle housing part 102, which is shown. The right side housing part is then folded underneath both the middle housing part and the left housing part.

The middle housing part 102 of the electronic device 100 includes a display 104, which extends across multiple housings. In the illustrated embodiment, the display 104 extends across both the middle housing part 102 and the left side housing part, where to the extent that the left side housing part is folded under the middle housing part 102, the portion of the display that is associated with the left side housing part is similarly folded under the middle housing part 102. In the illustrated embodiment, the left side housing part is coupled to the middle housing part via a hinge 106, which includes multiple linkages 108 that can move relative to one another in order to support the left side housing part being able to move relative to the middle housing part 104.

In the illustrated embodiment, the display 104 covers a large portion of the front facing. In at least some instances, the display can incorporate a touch sensitive matrix, that facilitates detection of one or more user inputs relative to at least some portions of the display, including interaction with visual elements being presented to the user via the display 104. In some instances, the visual element could be an object with which the user can interact. In other instances, the visual element can form part of a visual representation of a keyboard including one or more virtual keys and/or one or more buttons with which the user can interact and/or select for actuation. In addition to one or more virtual user actuatable buttons or keys, the device 100 can include one or more physical user actuatable buttons, however in the particular embodiment illustrated, none are specifically shown.

The middle housing part 102 additionally includes a speaker port 110 and a microphone port 112, which are typically respectively associated with a speaker and a microphone, in support of voice communications, as well as the receipt and playback of audio signals within the vicinity of the device 100. Generally, the speaker 106 is located toward the top of the device, which corresponds to an orientation consistent with the respective portion of the device facing in an upward direction during usage in support of a voice communication. In such an instance, the speaker 106 might be intended to align with the ear of the user, and the microphone 108 might be intended to align with the mouth of the user. The middle housing part 102 still further includes a forward camera 114 for capturing and/or recording images.

In the fully folded configuration, the device is suitably shaped for being used as a voice communication device, such as a cellular radio frequency telephone. The configuration is further suitable for being used for functions where the device is held in the user's hand, as well as for being stored, such as in a pocket or a purse. While in the illustrated embodiment, the type of electronic device being shown is a radio frequency cellular telephone, which incorporates an image capture capability, such as a camera function, other types of electronic devices are also relevant to the present application. Furthermore, while the use configuration shown in FIG. 1 is conducive to hand-held operation, other use configuration make the device suitable for functions that extend beyond hand-held types of operation.

In other words, the present application is generally applicable to electronic devices beyond the type being specifically shown. A couple of additional examples of suitable electronic devices that may additionally be relevant to the present application can include a tablet, a gaming device, a personal digital assistant, a dedicated camera, as well as any other form of electronic device including those that one might at least sometimes carry around on one's person.

Figure 2:
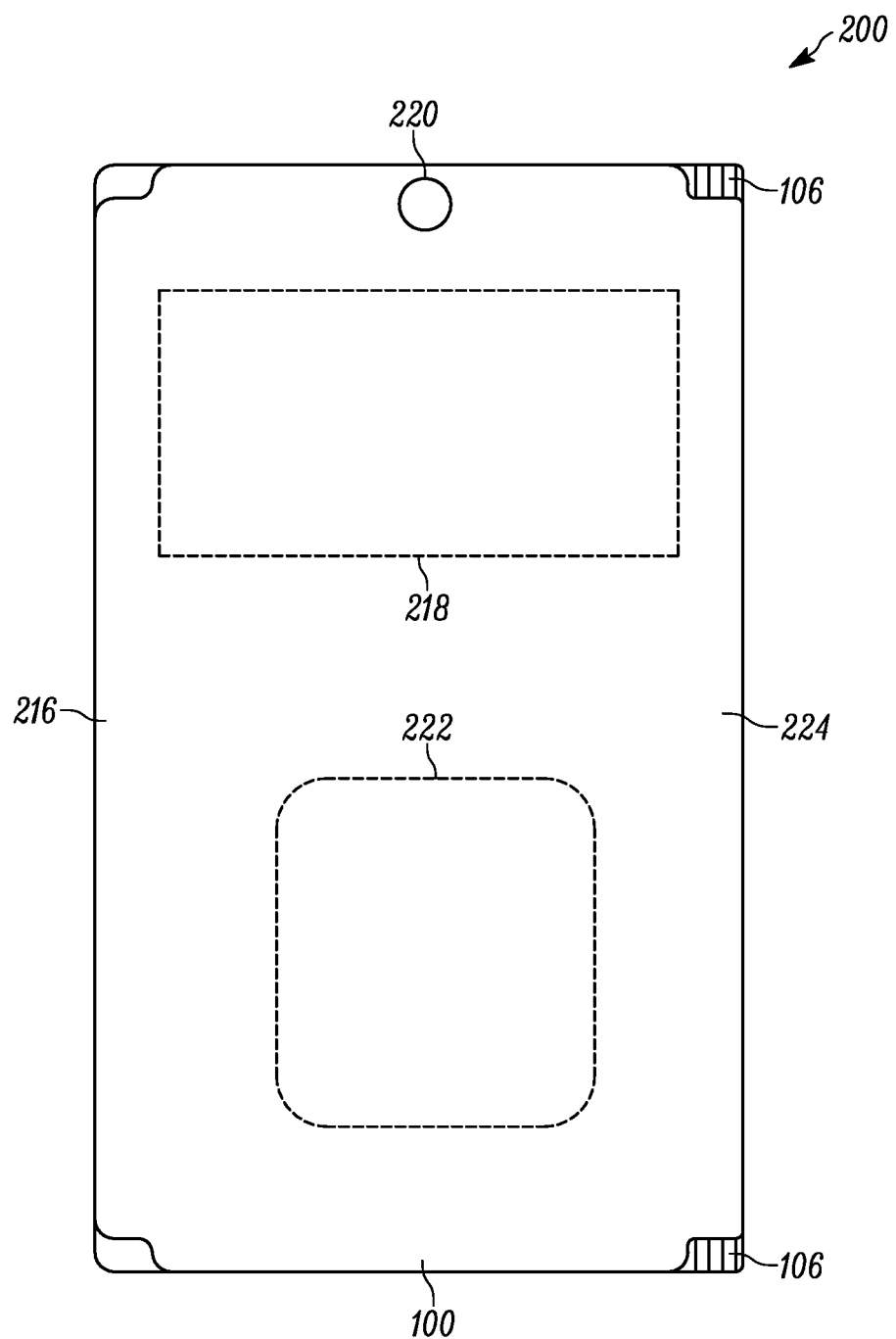
FIG. 2 is a back view of an exemplary electronic device, in a fully folded configuration.

FIG. 2 illustrates a back view 200 of the exemplary electronic device 100, in a fully folded configuration. While in a folded configuration, the back view of the exemplary electronic device 100 principally includes the right side housing part 216. In at least some instances, the right side housing part 216 serves as a cover, which at least in part can help serve to protect the portion of the display 104 that is included and folded under as part of the left side housing part. It is further possible that the right side housing part 216 if sized appropriately could further extend to cover all or portions of the middle housing part 102, as well as corresponding portions of the display 104 that are included as part of the middle housing part 102. However, in the illustrated embodiment, the right side housing part in the fully folded configuration stops short of covering the middle housing part. In at least some instances, the right side housing part 216 can include a window 218 in the cover, which can allow one or more portions of the display to be visible through the right side housing part. In at least some instances, the window will include at least a portion of the right side housing part being formed from a transparent material through which light can pass, but which may still offer some degree of enhanced protection.

The right side housing part 216 further includes an opening 220 or a further transparent window, which coincides with the portion of the right side housing part 216 that overlaps the optics of a rear facing camera that could be included as part of the left side housing part. It is further envisioned that the right side housing part 216 will support the placement and positioning of electronic components, which can electrically communicate with and/or receive power from elements positioned or placed in the other parts of the housing. In such an instance it is possible that a rear facing camera could be included as part of the right side housing part 216, as opposed to the left side housing part, which may preclude the need for the opening 220 or a further window. In the illustrated embodiment, the right side housing part 216 additionally includes a coil 222, which can be used to support wireless charging and/or near field communications. Other candidates for electrical components that could be incorporated as part of the right side housing part 216 include one or more antennas, batteries, keyboards, solar panels, lighting elements, sensors and speakers.

In at least some embodiments, the right side housing part 216 includes a hook 224 along the edge opposite the side of the right side housing part that attaches to the middle housing part 102. In the illustrated embodiment, the hook 224 wraps at least partially around the hinge 106 that couples the middle housing part 102 to the left side housing part. In some instances, the hook 224 can be part of a latch that includes a clasp that may help to better affix the hook 224 to one of the middle or left side housing part.

It is further possible the latch could include embodiments that do not include a hook 224. In at least some instances, the latch will be mechanical in nature and involve a physical interaction with a corresponding physical feature of a surface of one of the other housing parts. It is further possible that one or more magnets could be integrated as part of the latch, as well as the respective housing parts, to hold in place the disparate elements, such as the edge of the right side housing part 216 to a desired position along the surface of either the left side or middle housing part 102, where the right side housing part 216 can selectively correspondingly cover all or parts of the other housing parts, as well as respective portions of the display 104. In some instance, the use of magnets may allow the right side housing part 216 to better conform to the shape of the other housing parts.

Figure 3:
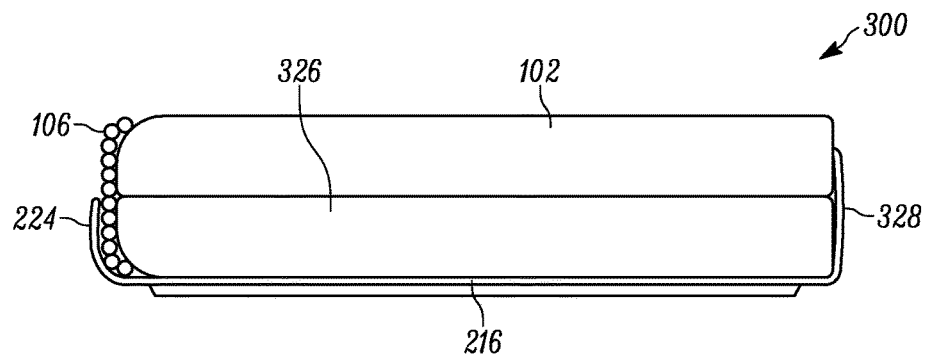
FIG. 3 is a bottom edge view of an exemplary electronic device, in a fully folded configuration.

FIG. 3 illustrates a bottom edge view 300 of the exemplary electronic device 100, in a fully folded configuration. From this perspective, one can more clearly see how the various housing parts nest, in a fully folded position including the middle housing part 102, the left side housing part 326 and the right side housing part 216. While one side edge of the right housing part 216 includes a hook 224, the other side edge of the right side housing part 216 is coupled to the middle housing part 102 by a relatively flexible portion 328 that is more readily adapted for wrapping around the end of the left side housing part 326.

Figure 4:
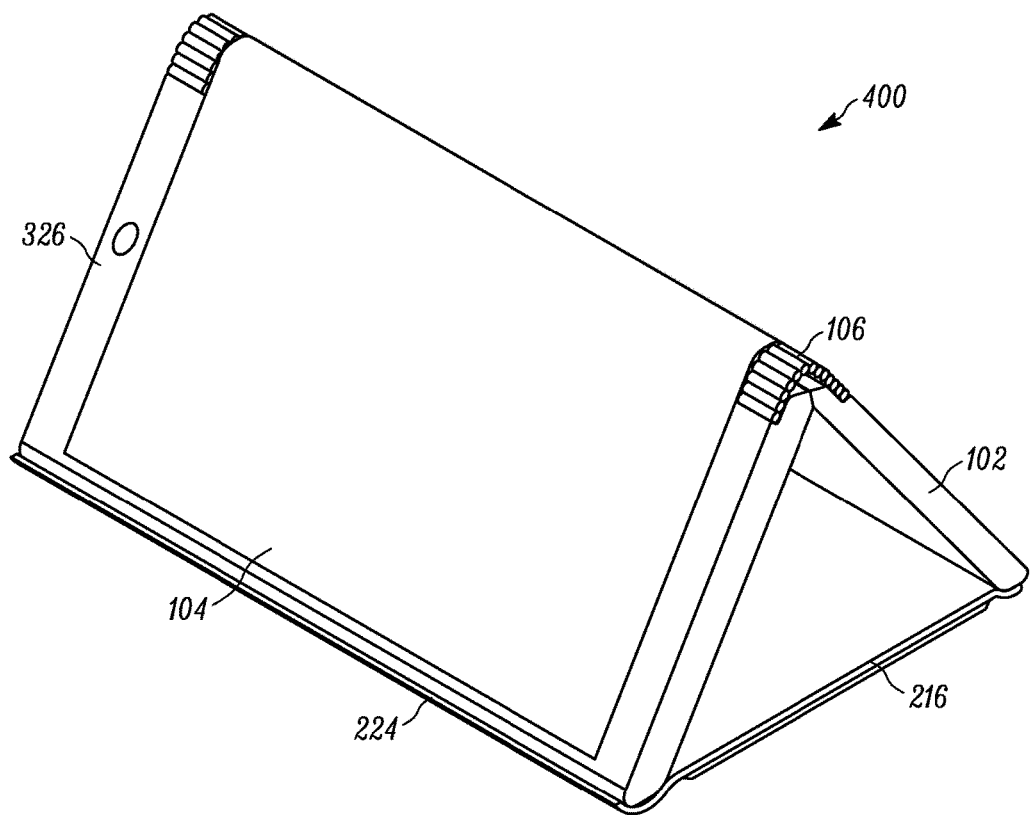
FIG. 4 is an isometric view of an exemplary electronic device, in a tented configuration.
Figure 5:
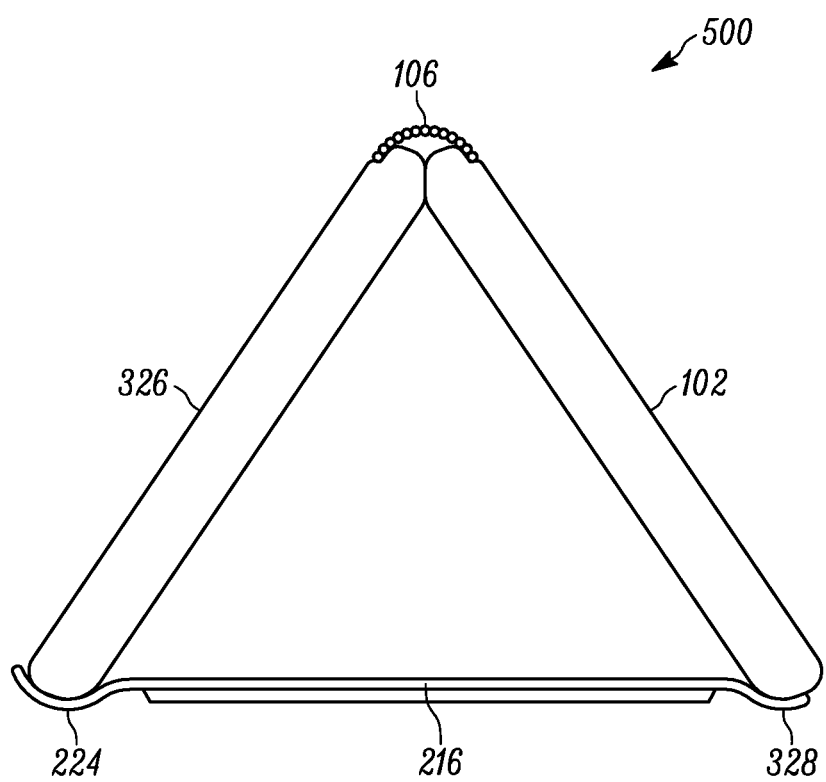
FIG. 5 is a bottom edge view of an exemplary electronic device, in a tented configuration.

FIGS. 4 and 5 illustrate the exemplary electronic device 100, in a tented configuration. FIG. 4 illustrates an isometric view 400 of the exemplary electronic device 100, in a tented configuration, and FIG. 5 illustrates a bottom edge view 500 of the exemplary electronic device 100, in a tented configuration. In the tented configuration, the housing parts have been partially unfolded, so that the end of the left side housing part 326 that is not coupled to the middle housing part 102 is received by the hook 224 of the right side housing part 216. In this use configuration, different portions of the display 104 are visible across both sides of the electronic device 100, which includes the left side housing part 326 and the middle housing part 102. The right side housing part 216 is facing downward, where, when the right side housing part 216 includes a wireless charging coil 222, the wireless charging coil 222 is better enabled to interact with a surface that has wireless charging capabilities. In such a use configuration, the device 100 could readily support a clock type function, which could also serve to produce an alarm.

Figure 6:
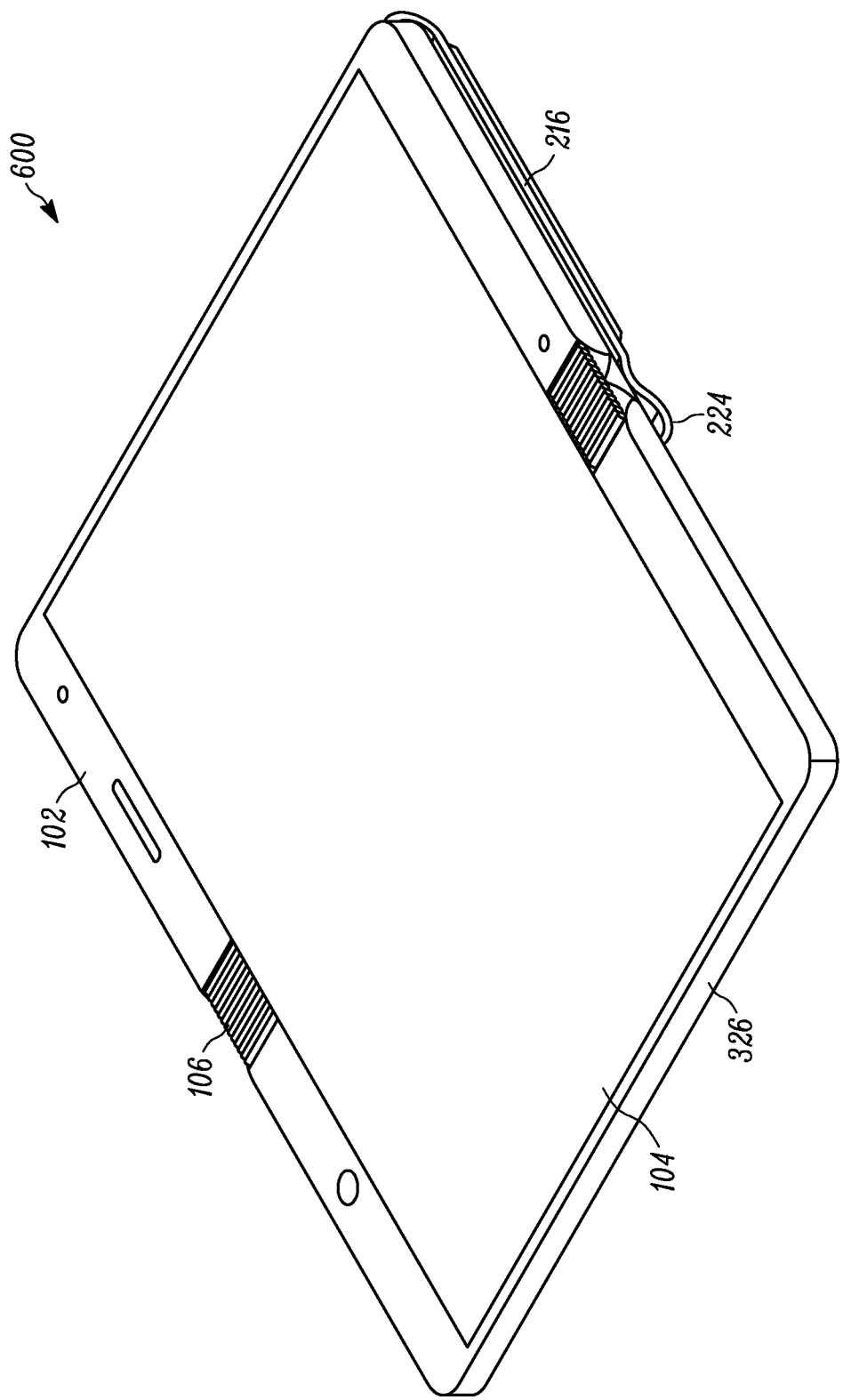
FIG. 6 is an isometric view of an exemplary electronic device, in a tablet configuration.
Figure 7:
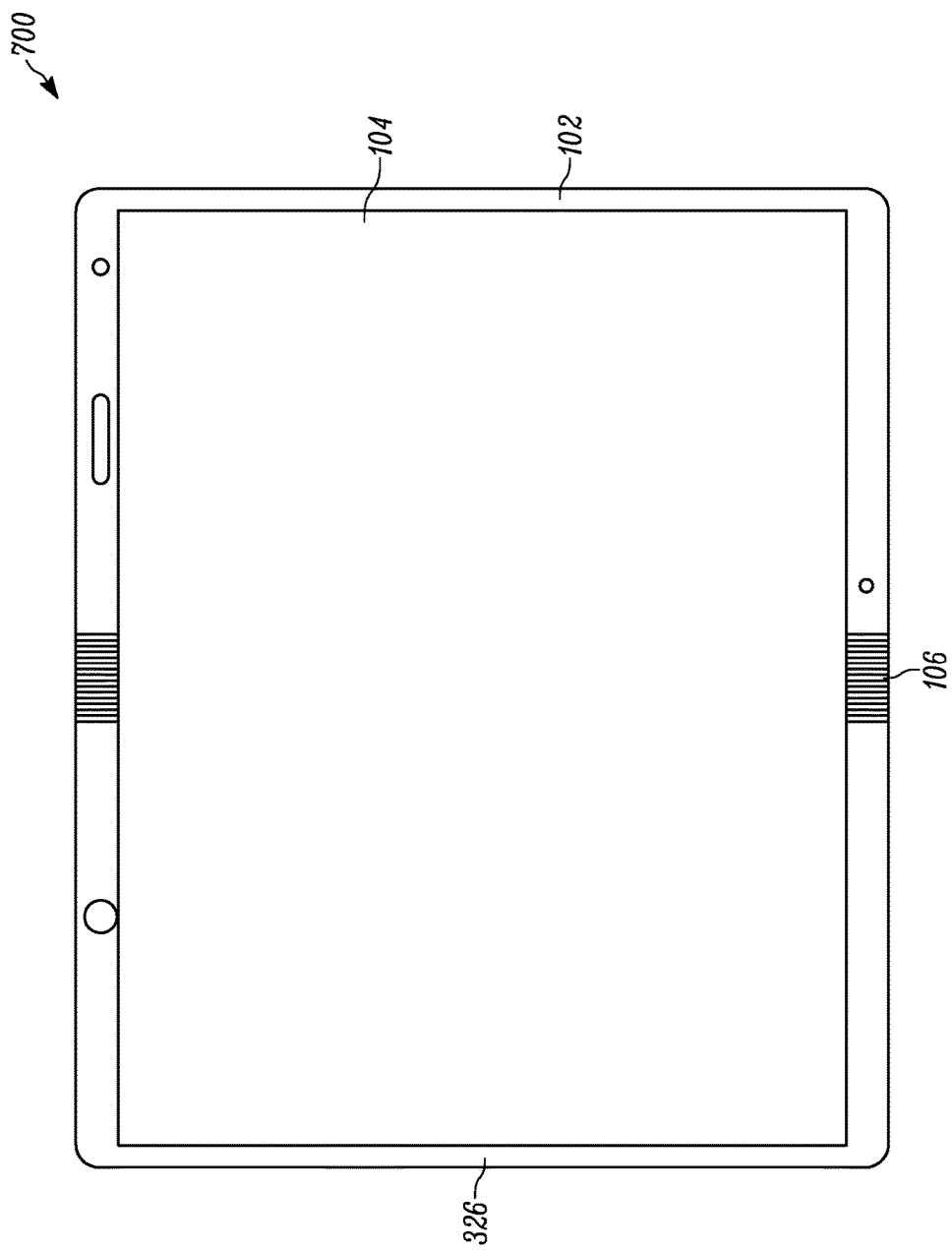
FIG. 7 is a front view of an exemplary electronic device, in a tablet configuration.
Figure 8:
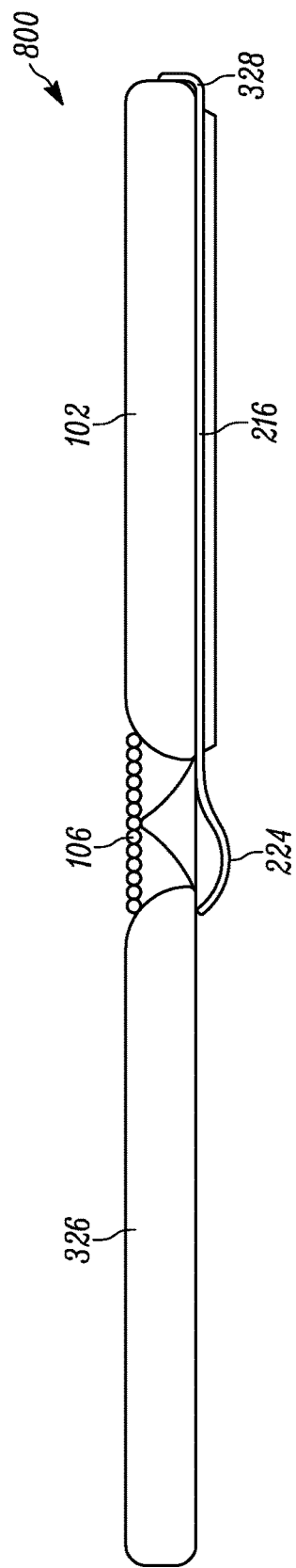
FIG. 8 is a bottom view of an exemplary electronic device, in a tablet configuration.

FIGS. 6, 7 and 8 illustrate the exemplary electronic device 100, in a tablet configuration. More specifically, FIG. 6 illustrates an isometric view 600 of the exemplary electronic device 100, in a tablet configuration, FIG. 7 illustrates a front view 700 of the exemplary electronic device 100, in a tablet configuration, and FIG. 8 illustrates a bottom view 800 of the exemplary electronic device 100, in a tablet configuration. In the tablet configuration, the left side housing part 326 is unfolded relative to the middle housing part 102, while the right side housing part 216 is folded relative to the middle housing part 102. By unfolding the left side housing part 326 relative to the middle housing part 102, the display 104 which extends across both housing parts 326 and 102 is unfolded to its full size. The enlarged screen size of the display 104 can make it easier to view visual content in connection with a media player or a browser, as well as visual content associated with the execution of an application and/or program on the device 100.

In the tablet configuration, the exemplary electronic device 100 is sized to be received in one's lap, or on a surface like a table or a desktop. The larger screen can also make it easier to input information into the device 100 through a touch sensitive input capability, which might be supported by the display 104. Furthermore, when in a tablet configuration with the middle housing part 102 and the left side housing part 326 unfolded, the cameras associated with each of the middle housing part 102 and the left side housing part 326 could be used together to support the capture of a stereo image, which could be intended to give a 3-dimensional visual impression, when subsequently viewed.

Figure 9:
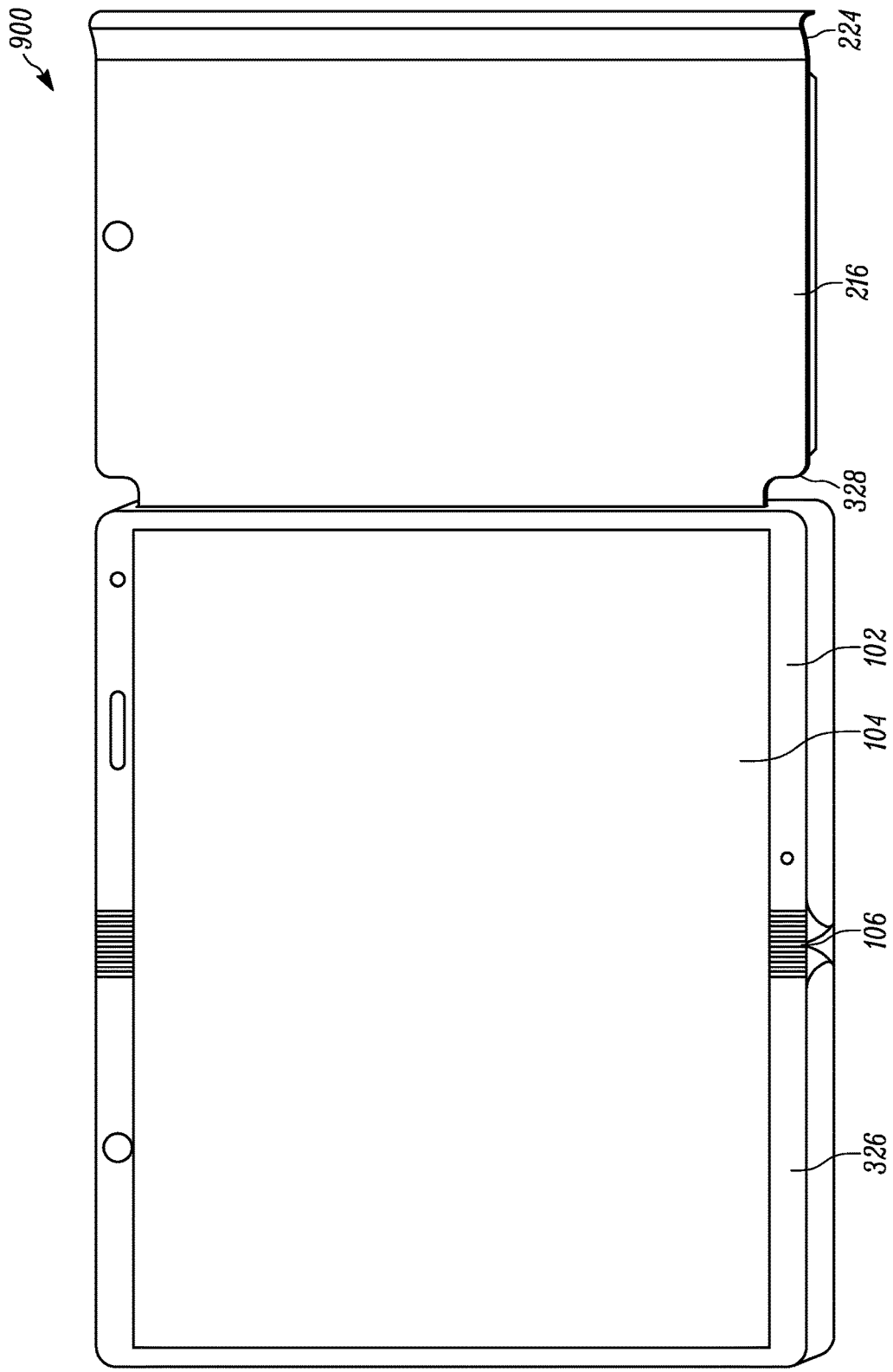
FIG. 9 is a perspective view of an exemplary electronic device, in a fully unfolded configuration.

FIG. 9 illustrates a perspective view 900 of the exemplary electronic device 100, in a fully unfolded configuration. In the fully unfolded configuration, instead of being folded behind the middle housing part 102, the right side housing part 216 extends away from the middle housing part 102 in a direction that is opposite to the left side housing part 326. Such an arrangement, places the hook 224 of the right side housing part 216 at one end of the device. The hook 224 can then be used to hang the device 100 from a vertical surface or a surface having a vertical component, such as a wall, where the wall has structure upon which the hook 224 can be attached or hung. The hook 224 could also be used to hang the device 100 from a branch or a bar, or even a rope or wire that is strung horizontally between two points.

Figure 10:
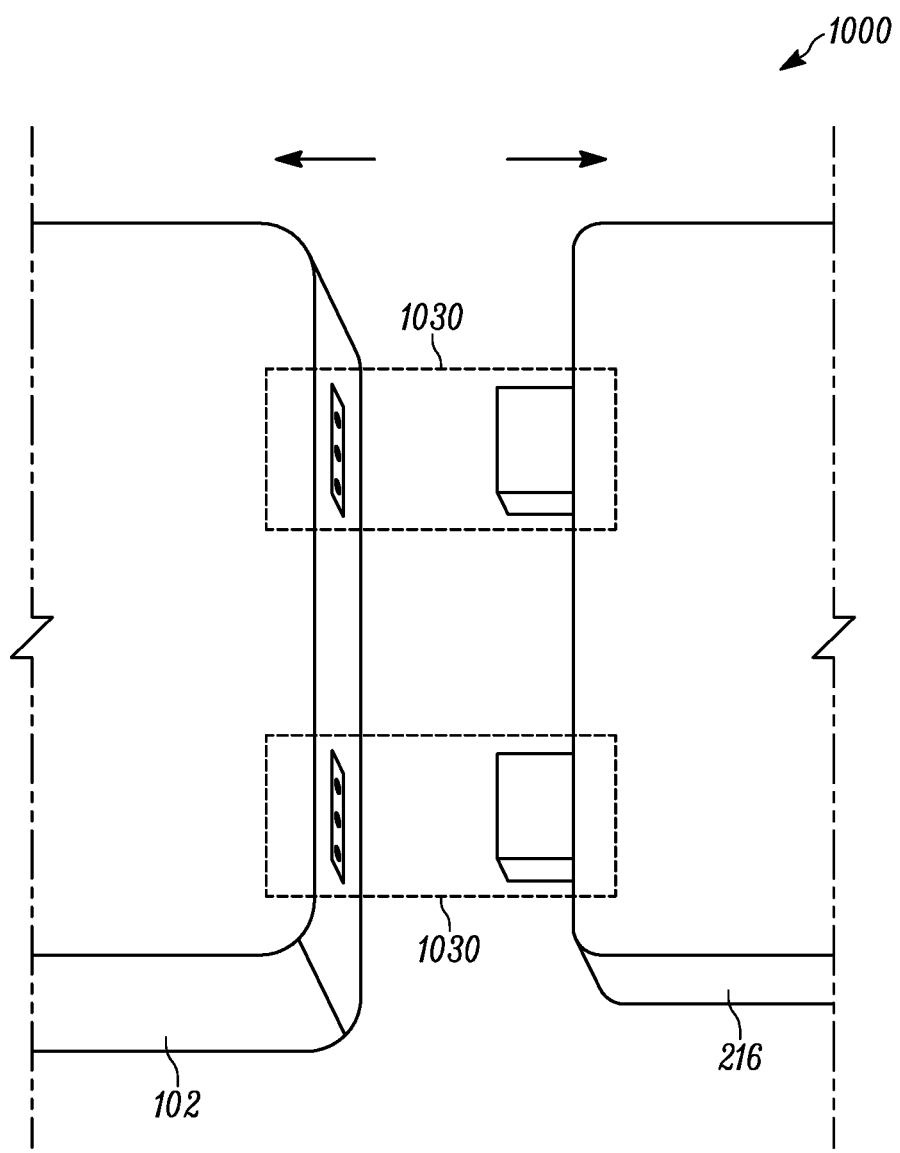
FIG. 10 is a partial perspective view showing the decoupling of two of the housing parts.

FIG. 10 illustrates a partial perspective view 1000 showing the decoupling of two of the housing parts. For example, in at least some instances it may be possible to decouple the right side housing part 216 from the middle housing part 102. Where it is desirable to share electronic signals between segments across the coupling, in addition to a mechanical coupling, there can be provisions for an electronic coupling.

In the illustrated embodiment, the coupling supports a pair of electrical connections 1030. In at least some instances, the coupling may be akin to a flex circuit type connection, where the coupled end of the right side housing part 216 might benefit from an increased degree of flexibility. In instances, where it might be possible to decouple the right side housing portion 216 from the middle housing portion 102, the right side housing portion could include a solar panel and an auxiliary battery, so that the detached right side housing portion can be hung in a sunny spot and the auxiliary battery could be charged, while the rest of the device including the left side housing portion 326 and the middle housing portion 102 was being used by the user. Alternatively, instead of a solar panel, the right side housing portion could include a wireless charging coil, which would allow the detached portion to be charged via a charging surface, while the user continued to make use of the rest of the device without regard to the location of the charging surface.

While the preferred embodiments have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. An electronic device having at least a three part housing foldable between multiple use positions, the three part housing including a first housing part, a second housing part, and a third housing part, where each of the three housing parts has a front facing, a back facing, and two spaced apart sides respectively coupled between the front facing and back facing at opposite edges of the front and back facings, where the second housing part is respectively movably coupled to a side of each the first housing part and the third housing part at a different one of the two spaced apart sides of the second housing part, the electronic device further includes:
   a flexible display which extends along at least portions of the first housing part and the second housing part, and across the movably coupled sides, at which the first housing part is coupled to the second housing part;
   wherein the third housing part is adapted to be moved relative to the second housing part to selectively cover at least a portion of the flexible display; and
   wherein the third housing part includes a hook proximate the side which is spaced apart from the side of the third housing part which is movably coupled to the second housing part.

2. An electronic device in accordance with claim 1, wherein the hook is part of a latch which attaches the side of the third housing to one of the first and second housing parts.

3. An electronic device in accordance with claim 1, wherein the hook is adapted to engage the side of the first housing part which is spaced apart from the side of the first housing part which is movably coupled to the second housing part.

4. An electronic device in accordance with claim 1, wherein the hook is adapted to engage at least one of the other two housing parts proximate the sides of the first and second housing parts that are movably coupled together.

5. An electronic device in accordance with claim 1, wherein the hook is adapted to attach to an element, which is separate from the electronic device.

6. An electronic device in accordance with claim 1, wherein the first housing part is movably coupled to the second housing part via a hinge.

7. An electronic device in accordance with claim 1, wherein the first housing part is adapted to fold closed relative to the second housing part via the movable coupling therebetween, wherein the back facing of the first housing part is positioned proximate and substantially parallel to the back facing of the second housing part, so as to at least partially overlap.

8. An electronic device in accordance with claim 7, wherein the flexible display is associated with the front facing of the respective portions of the first and second housing parts along which the flexible display extends.

9. An electronic device in accordance with claim 1, wherein the first housing part is adapted to fold open relative to the second housing part via the movable coupling therebetween, wherein at least the first housing part is positioned relative to the second housing part in a side by side arrangement, where the front or back facing of the first housing part does not overlap the front or back facing of the second housing part.

10. An electronic device in accordance with claim 9, wherein the third housing part is adapted to fold open relative to the second housing part via the movable coupling therebetween, wherein at least the third housing part is positioned relative to the second housing part in a side by side arrangement, where the front or back facing of the third housing part does not overlap the front or back facing of the second housing part.

11. An electronic device in accordance with claim 1, wherein the third housing part includes electrical elements which support the operation of the electronic device.

12. An electronic device in accordance with claim 1, wherein the third housing part includes a wireless charging coil.

13. An electronic device in accordance with claim 1, wherein the third housing part includes an antenna.

14. An electronic device in accordance with claim 1, wherein the third housing part includes a solar energy charging panel.

15. An electronic device in accordance with claim 1, wherein the third housing part includes a battery.

16. An electronic device in accordance with claim 1, wherein the third housing part include a material adapted to help protect any covered portions of the flexible display.

17. An electronic device having at least a three part housing foldable between multiple use positions, the three part housing including a first housing part, a second housing part, and a third housing part, where each of the three housing parts has a front facing, a back facing, and two spaced apart sides respectively coupled between the front facing and back facing at opposite edges of the front and back facings, where the second housing part is respectively movably coupled to a side of each the first housing part and the third housing part at a different one of the two spaced apart sides of the second housing part, the electronic device further includes:
   a flexible display which extends along at least portions of the first housing part and the second housing part, and across the movably coupled sides, at which the first housing part is coupled to the second housing part;
   wherein the third housing part is adapted to be moved relative to the second housing part to selectively cover at least a portion of the flexible display; and
   wherein the movable coupling between the second housing part and the third housing part is detachable.

18. An electronic device in accordance with claim 17, wherein the movable coupling between the second housing part and the third housing part, which is detachable, includes one or more electrical connections, which can be selectively attached and detached with the movable coupling, for conveying electrical signals between the second housing part and the third housing part, when the second housing part and the third housing part are attached via the movable coupling.

19. An electronic device having at least a three part housing foldable between multiple use positions, the three part housing including a first housing part, a second housing part, and a third housing part, where each of the three housing parts has a front facing, a back facing, and two spaced apart sides respectively coupled between the front facing and back facing at opposite edges of the front and back facings, where the second housing part is respectively movably coupled to a side of each the first housing part and the third housing part at a different one of the two spaced apart sides of the second housing part, the electronic device further includes:
- a flexible display which extends along at least portions of the first housing part and the second housing part, and across the movably coupled sides, at which the first housing part is coupled to the second housing part;
- wherein the third housing part is adapted to be moved relative to the second housing part to selectively cover at least a portion of the flexible display; and
- wherein the third housing part includes a window through which at least a portion of the flexible display is visible, when the third housing part selectively covers at least a portion of the flexible display.

* * * * *